Patented Mar. 4, 1930

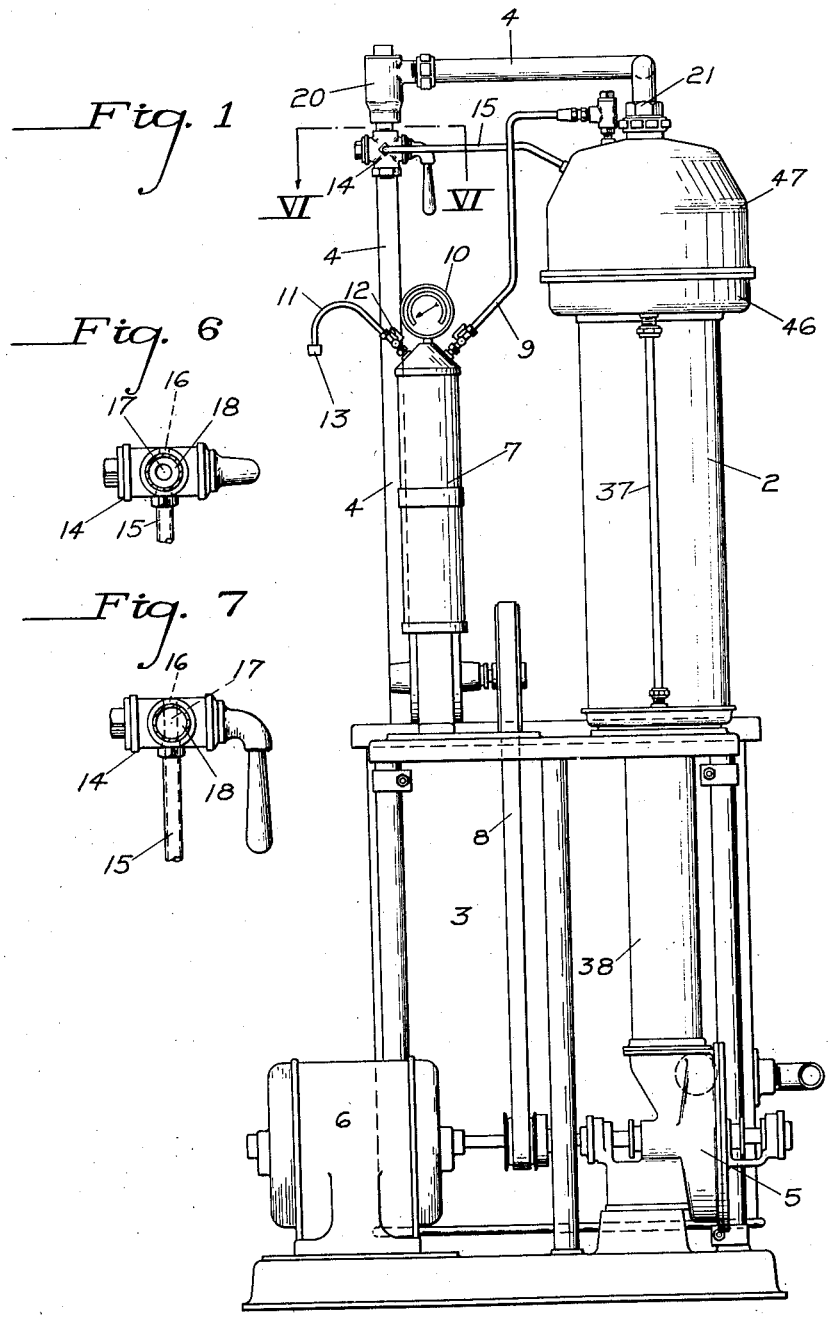

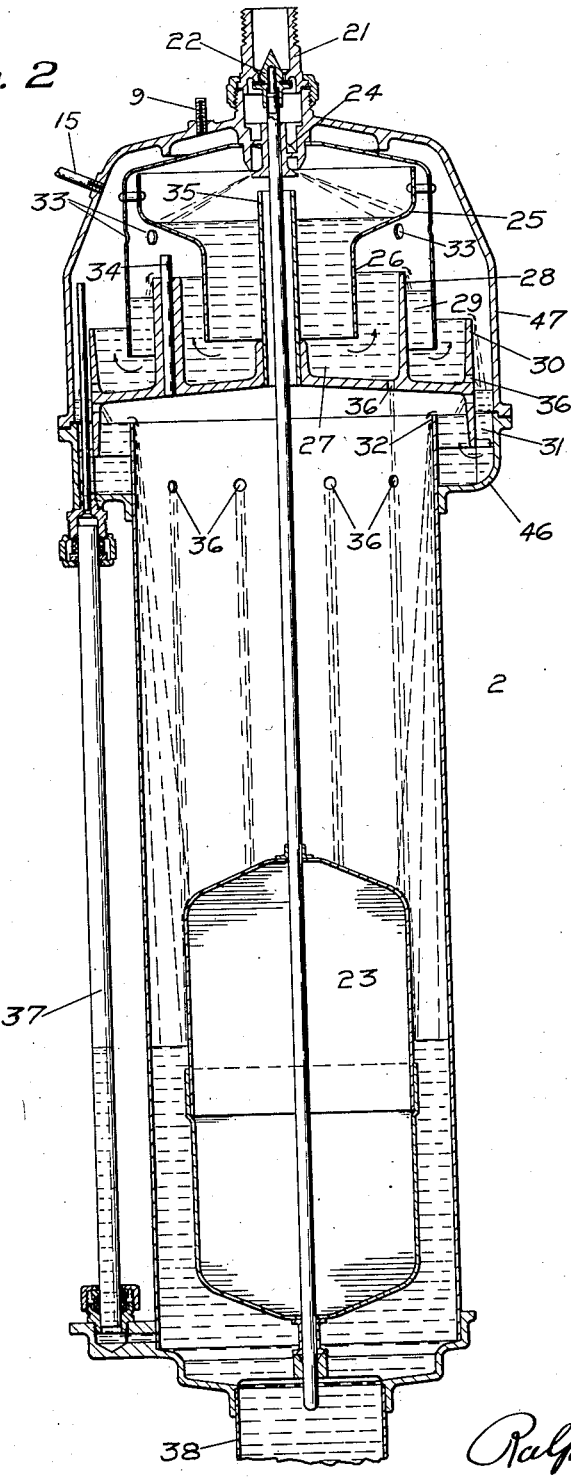

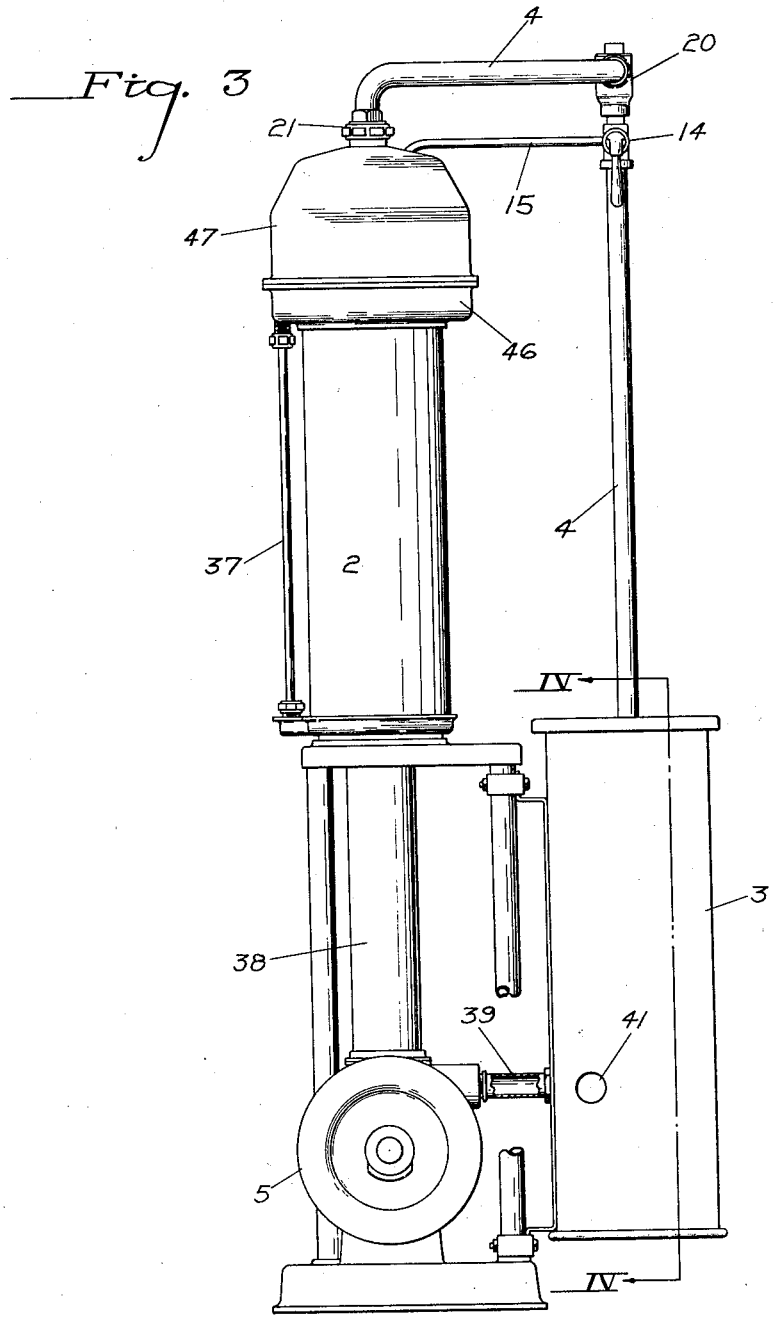

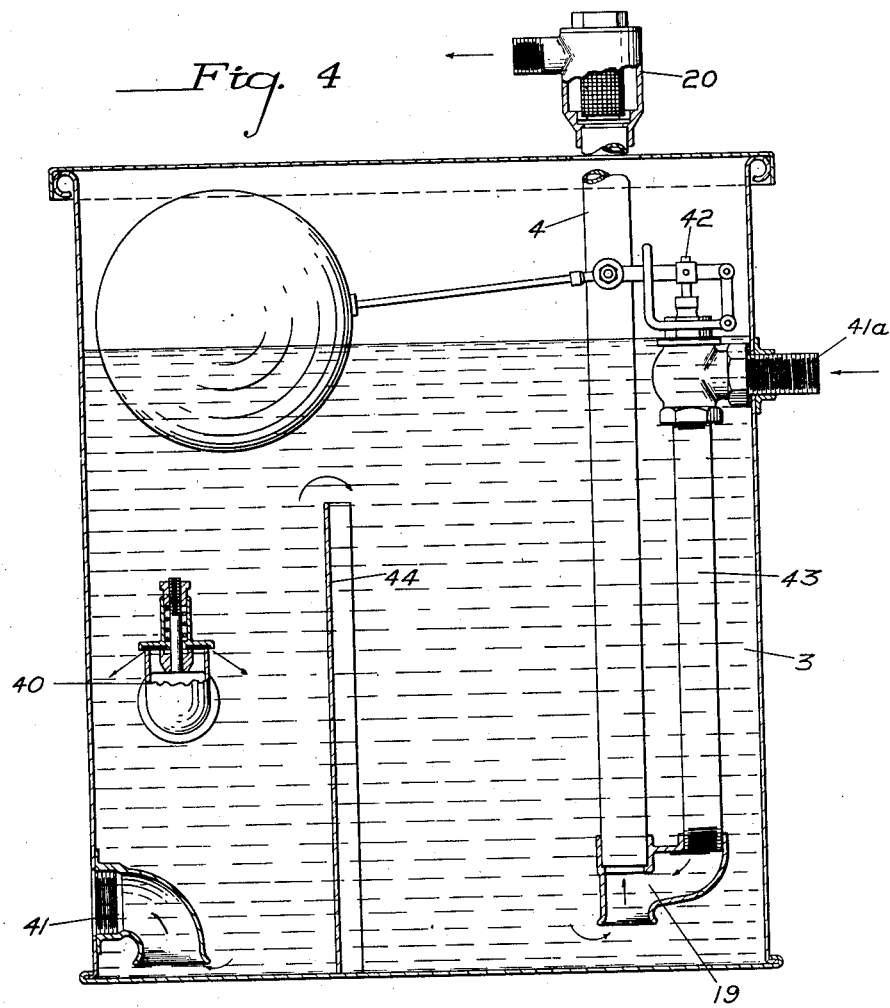
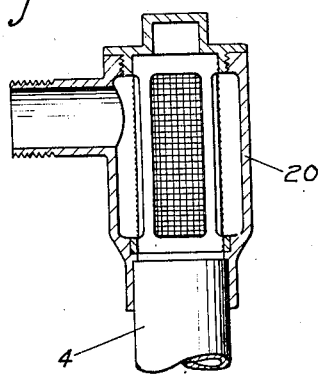

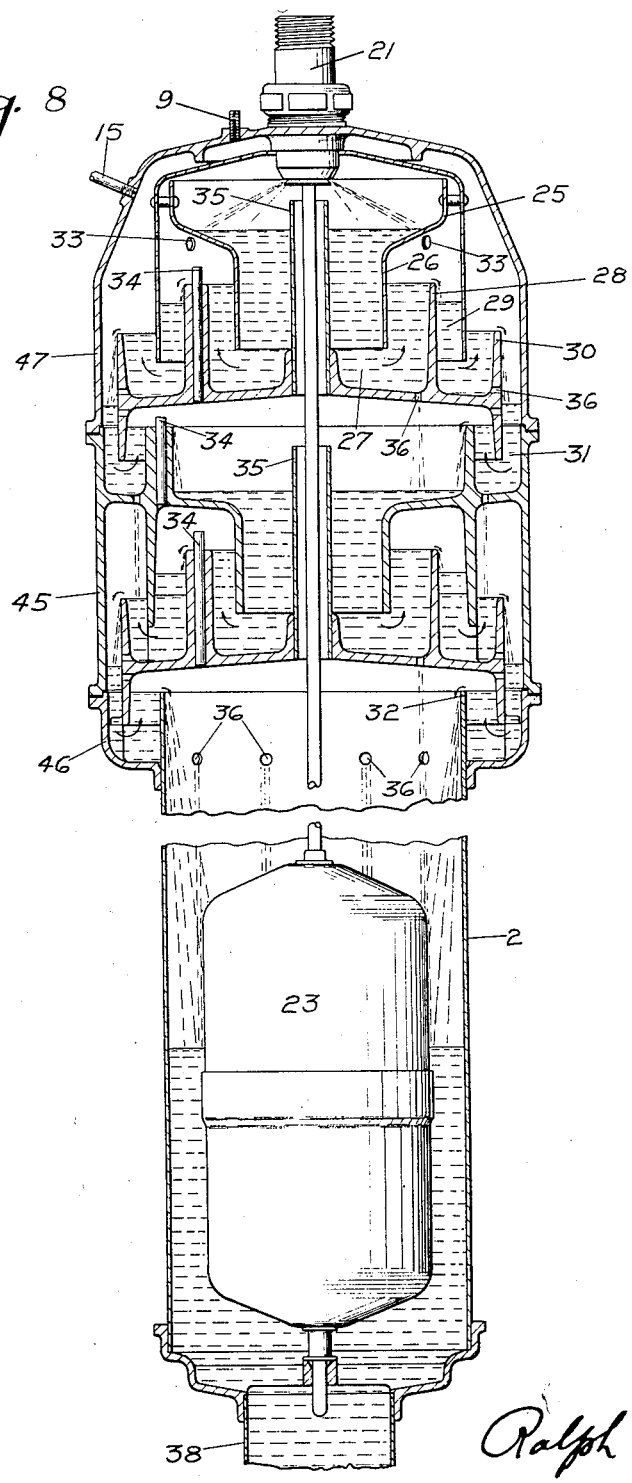

1,749,561

UNITED STATES PATENT OFFICE

RALPH W. CADMAN, OF PITTSBURGH, PENNSYLVANIA

DEGASIFICATION OF LIQUIDS

Application filed June 26, 1924. Serial No. 722,626.

This invention relates broadly to the degasification of liquids, and is particularly useful in connection with the degasification of liquids intended for human consumption, such as fruit juices, vinegar, cider, water to be used in carbonated beverages and the like.

It has long been recognized that the presence of air in such liquids is harmful. For example, in the carbonation of ordinary tap water, the air which is normally dissolved in the water resists complete carbonation, and, in addition, materially lowers the quality of the product. It is a proven fact that carbonated beverages made from water which has been deaerated prior to carbonation are less apt to sour, ferment or support aerobic growths. Also, with the air thus removed, no oxidation of the flavoring syrup takes place, with the resulting loss of flavor, and since the greatest hindrance to complete gas absorption is removed, far greater economy of carbonic acid gas is attained.

Methods of degasifying liquids which involve the heating thereof, as employed, for instance, in the treatment of boiler water, are entirely unsuited for the treatment of beverage liquids. The installation and operating costs of the apparatus are entirely too great for most plants, and it is generally undesirable to heat the liquids being handled. This is particularly true if the liquid is to be carbonated, since the gas absorption capacity decreases rapidly with any increase in temperature, and in order to properly carbonate the liquid it would be necessary to have refrigeration means for cooling the deaerated liquid. In the case of many of the fruit juices which it is desirable to degasify, the characteristic flavor of the fresh fruit juice is destroyed by heating, thus rendering any process involving heating entirely unsuitable.

It has therefore been proposed to degasify such liquids by spraying them into a region of greatly reduced pressure at ordinary temperatures. This process, as heretofore carried out, is far from satisfactory, since only a portion of the air is removed, and the advantages attainable by complete deaeration are never entirely realized. Generally they are largely lost, as tests show that such processes are effective only for removing 40% or less of the air content.

I have found that by degasifying the liquid in a plurality of stages, as for example by passing it through a degasifier two or more times, it is possible to remove as high as 95% of the air from solution without raising the temperature of the liquid above ordinary room temperature. My process is preferably carried out by passing the liquid being treated a number of times through a circulatory system containing a degasifier. When the apparatus is arranged to supply degasified liquid to a carbonator, the general construction of carbonators is such that the liquid is removed intermittently, and I preferably provide means for replacing the withdrawn liquid with "raw" or untreated liquid. If the liquid is to be withdrawn continuously, my process may be advantageously carried out by providing a circulatory system through which the liquid is circulated at a materially greater rate than the rate of withdrawal and by properly positioning the inlet and outlet ports to insure the desired circulation. The process may thus be an intermittent, a semi-continuous, or a continuous one.

In the accompanying drawings, illustrating the present preferred embodiment of my invention:

Fig. 1 is a side elevation of a degasifier and circulatory system therefor embodying my invention, Fig. 2 is a vertical section through the degasifier proper, Fig. 3 is a side elevation of the apparatus shown in Fig. 1, Fig. 4 is a vertical section on the line IV—IV of Fig. 3, Fig. 5 is a vertical section through a strainer which is preferably interposed in the circulatory system, Fig. 6 is a section on the line VI—VI of Fig. 1, Fig. 7 is a similar view but showing a different position of the apparatus, and Fig. 8 is a view similar to Fig. 2 but showing the manner of increasing the capacity of the degasifier.

In the illustrated embodiment of the invention there is shown a degasifier 2 adapted to draw liquid from a reservoir 3 through a conduit 4. A suitable pump 5, drawing liquid from the bottom of the degasifier and discharging into the reservoir 3, provides the circulating means for the water or other liquid being treated. The pump is direct-connected to a motor 6, and a suitable vacuum pump 7, driven from the motor through a belt connection 8, is provided for maintaining the desired low pressure condition in the degasifier 2.

The vacuum pump 7 is connected to the upper portion of the degasifier by a pipe 9 and is preferably provided with a vacuum gage 10 for indicating the pressure in the degasifier. A quick rough test of the air or gas content in a given liquid is very frequently desirable, and I provide a supplemental pipe 11 having a valve 12 therein and terminating in a cork 13 for making such tests. When it is desired to test the gas content of a particular bottle of liquid, it is pressed up over the cork 13 and the valve 12 is opened. The air or gas immediately begins to pour out of the liquid and during its egress fills the liquid with fine bubbles, giving the entire liquid a milky appearance. With a little experience, an observer can tell by this test the approximate air content of the liquid.

A valve 14 is interposed in the conduit 4, and when it is closed the operation of the entire apparatus ceases. In order to permit complete draining off of the liquid from the degasifier by the pump, it is desirable to relieve the vacuum in the degasifier when no liquid is being degasified, and this is accomplished by providing a relief pipe 15 leading from the valve 14 to the degasifier. As shown in Figs. 6 and 7, a hole 16 is drilled in the side of the valve body opposite the point where the pipe 15 is connected, and when the valve is turned to the "off" position, this hole co-operates with the opening 17 in the plug 18 of the valve to let air enter the degasifier and thus bring the pressure therein up to atmospheric. If it is desired to attain a vacuum in the degasifier before permitting circulation of the liquid, the valve plug may be turned to about 45°, thus closing off both passages.

The circulatory system will be best seen by reference to Figs. 4 and 2. Liquid is drawn from the reservoir 3 through a branch fitting 19 at the lower end of the conduit 4. It passes upwardly through the conduit and the valve 14 through a strainer 20 which is shown in detail in Fig. 5, and thence to the degasifier 2.

The degasifier is shown in detail in Fig. 2. Water enters from the conduit 4 through a fitting 21 at the top of the degasifier and through a valve 22 whose opening and closing is controlled by a float 23. Below the valve the incoming liquid encounters a spiral passage 24 which gives it a swirling motion and breaks it up into spray as it enters the degasifier proper. Since the vacuum pump 7 maintains a very low pressure in the degasifier, a large portion of the air and other gases contained in the liquid immediately pass out of solution and are taken off by the vacuum pump.

As the water or other liquid falls it is collected in a receiver 25 having a portion 26 of reduced diameter. The construction of the apparatus is such that as the water passes on it must travel downwardly through this reduced portion, thus giving the air bubbles a chance to separate out by flotation.

The liquid next passes into a well 27 from which it travels by passing upwardly and over a weir 28. An inspection of Fig. 2 will show that the comparative areas are such that the upward travel will be very slow as compared with the downward travel through the passage 26. This provision affords a greater chance for separation by flotation than would otherwise be the case, for separation by flotation requires a certain amount of time. I have found that a construction such as above described provides an exceedingly efficient separator in a very small compass.

After passing over the weir 28 the water again passes downwardly through a passage 29 and then upwardly and over a weir 30. The next step is downwardly through a passage 31 and then upwardly and over a weir 32. All of these steps assist in removing the gases from solution, the weirs acting to break up the water and permit ready escape while it is finely divided, and the various intermediate passages permitting escape by flotation. Preferably the passages are all proportioned to provide a relatively slow upward movement of the liquid as above described.

Openings 33 and tubes 34 and 35 are provided for equalizing pressure throughout the degasifier and insuring that the desired vacuum will obtain throughout the chamber. Openings 36, which are too small to handle the volume of liquid regularly handled by the apparatus, but which provide a series of small leaks, are placed as shown to facilitate draining of the apparatus.

After the liquid passes over the weir 32 it is permitted to fall downwardly in a spray to the bottom of the degasifier, where it collects and furnishes flotation for the valve float 23. It is found in practice that degasification is completed long before the liquid reaches this point, but the final spray is provided for insuring that as much dissolved gas as can be removed will have every opportunity to escape, not only because of the final spray, but also because of the splashing when the drops reach the lower pool, and also by flotation after the liquid collects at the bottom. A gage glass 37 is provided for indicating the liquid level.

The degasified liquid passes from the degasifier 2 to the pump 5 through a large conduit 38, and is discharged by the pump through a conduit 39 and a spring-loaded check valve 40 into the reservoir 3. From the reservoir it is again circulated through the degasifier, and its air content is again reduced.

While, as above stated, a degasifier operating at low pressure and ordinary temperature is effective only for the removal of up to 40% of the air when used in the ordinary manner, it is possible to remove, for all practical purposes, the entire content of dissolved air or oxygen by the above described process of recirculation.

An outlet 41 is provided for withdrawing degasified liquid from the apparatus as needed, and an inlet 41ª is also provided for making up the resulting deficiency in the reservoir 3. The amount of liquid withdrawn is governed by the carbonator, filling machine, or other withdrawal means, and, as above stated, the withdrawal may be either intermittent, semi-continuous, or continuous. A float valve 42 governs the amount of raw liquid which enters and it functions to make up the deficiency in the circulatory system as soon as it occurs by reason of the withdrawal of treated liquid. It will be seen that it is possible as an operating feature, to "short-circuit" the apparatus by closing the valve 14. The apparatus is designed to circulate liquid in materially larger amounts than the normal requirements of the plant, thus insuring that all of the liquid will pass through the degasifier more than once.

The raw liquid is preferably carried from the valve 42 through a conduit 43 terminating in the branch fitting 19. Bearing in mind the circulatory capacity of the apparatus, it will be seen that a large quantity of previously degasified liquid will be carried up through the conduit 4, and, if there happens to be a deficiency of liquid in the reservoir at that particular time, there will be mixed therewith a quantity of raw water from the conduit 43. There is therefore no likelihood of raw water being drawn directly through to the outlet 41 unless the apparatus is deliberately short-circuited as above described. However, a division wall 44 may be provided if desired. This wall serves not only as a baffle, but also insures thorough mixing of raw and degasified water if the latter should by any chance get into the reservoir directly.

The mixture of raw liquid and previously degasified liquid passes through the degasifier and the percentage of dissolved gases is again material reduced. Repetition of the process is effective for the removal of almost the entire gas content of the liquid.

It will be understood that the two constituents of air are not equally soluble, oxygen being superior in this respect. The term "deaeration" is employed, however, in its usual sense, to signify the step of removing both of these gases, or either of them.

The interior structure of the degasifier may be varied to meet the particular requirements of the liquid being handled. For example, in deaerating orange juice it is desirable to remove everything except one weir and recirculate the juice a number of times to prevent foaming of the liquid. In other cases, it may be desirable to provide more passages and weirs than shown in Fig. 2. For example, it may be desired to construct an apparatus of larger capacity. By providing a greater number of passages the liquid may be subjected to the reduced pressure for the same period of time, even though the circulation rate is materially increased.

Fig. 8 shows a preferred manner of supplying these extra passages. It will be noted that the general structure of the degasifier shown therein is the same as that shown in Fig. 2, except that a supplemental section 45 is inserted between the two castings 46 and 47 forming the upper portion of the degasifier in Fig. 2. The upper portion of this supplemental section corresponds to the upper part of the casting 46, and the lower part corresponds to the lower part of the casting 47. It is therefore possible to provide as many supplemental sections as desired to get any particular capacity.

It will be seen that I provide a degasifying system particularly useful in the treatment of food products, whereby remarkably increased efficiencies may be obtained in an apparatus of comparatively low cost. It is highly desirable in the degasification of water and other liquids, may be readily installed in existing apparatus, and may be readily short-circuited whenever this is desirable. The provision for mixing raw liquid with previously degasified liquid and degasifying the mixture makes possible the continuous operation of the apparatus without any loss in efficiency.

While I have shown the preferred form of my invention it will be understood that the illustrated apparatus does not limit my invention, which may be otherwise embodied within the scope of the following claims.

I claim:

1. Apparatus for degasifying liquids, comprising a reservoir, a degasifier, a conduit from the reservoir to the degasifier, a conduit from the degasifier to the reservoir, means for circulating the liquid therethrough, and a division wall in the reservoir between the outlets of said conduits in the reservoir.

2. Apparatus for degasifying liquids, comprising a reservoir and a degasifier, the degasifier having a partition wall, a conduit from the reservoir to the degasifier and a raw liquid inlet on one side of the partition wall, and a conduit from the degasifier to the reservoir and an outlet for treated liquid on the other side of the partition.

3. Apparatus for degasifying liquids comprising a reservoir subjected to atmospheric pressure, and having a degasified liquid delivery port and a raw liquid inlet port, a degasifier, means for delivering liquid from said reservoir to said degasifier, means for withdrawing liquid from said degasifier, raising the pressure thereof to atmospheric pressure and delivering the liquid to said reservoir, means for maintaining a vacuum in said degasifier, and means for breaking said vacuum when the liquid flow is cut off through said degasifier.

4. In combination with a liquid circulating system including a reservoir subjected to atmospheric pressure, a degasifier, a pipe for delivering liquid from the reservoir to the degasifier having its inlet submerged by liquid in the reservoir, and a pump for withdrawing liquid from the degasifier and delivering it to said reservoir, of means for augmenting the liquid in said reservoir comprising a liquid delivery pipe extending into said reservoir and communicating with the interior thereof and with said first-mentioned pipe, a valve for controlling the flow through said last-mentioned pipe, and a float within said reservoir for controlling said valve.

5. A degasifier comprising a chamber having a liquid inlet port, a gas discharge port and a liquid delivery port, means associated with said inlet port for projecting the water delivered therethrough in the form of spray, baffles located and arranged within said chamber for collecting and consolidating such spray into a body of liquid and for directing the liquid so collected in a defined upwardly moving stream, and means communicating with said delivery port for increasing the pressure of the liquid and for discharging it from said chamber.

6. A degasifier comprising a chamber having a liquid inlet port at the top thereof, a liquid delivery port at the bottom thereof and a gas discharge port, means associated with said inlet port for projecting liquid delivered therethrough in the form of an annular spray, baffles located and arranged within said chamber for collecting the spray and for causing the liquid traversing said chamber to alternately move upward in a consolidated stream and then downward in the form of a mass of falling drops, and means communicating with said delivery port for discharging liquid from said degasifier.

7. A degasifier for liquids, comprising a substantially cylindrical chamber having a liquid inlet port located in the top thereof, a liquid delivery port located near the bottom thereof and a gas discharge port, means associated with said inlet port for delivering the liquid to said chamber in the form of an annular spray, a series of superimposed spaced baffles located and arranged within said chamber to cause the liquid traversing said chamber to alternately move upwardly in a consolidated stream and then downwardly in the form of an annular curtain of extended surface, means communicating with said delivery port for discharging liquid from said chamber, and means communicating with said discharge port for withdrawing air and other fluids from said chamber and maintaining a reduced pressure therein.

8. In a liquid degasifying system, a storage reservoir, a degasifier comprising a series of at least three unitary separable sections, through which the liquid to be degasified passes successively, the first of said sections including means for delivering the liquid to the interior thereof in the form of a mass of separate drops, and means for collecting the liquid so delivered in a body of slowly moving liquid and delivering it to the second section in the form of a cascade, said second section including means for alternately collecting the liquid in a slowly moving body and causing a relatively rapid movement thereof while exposing an extended surface area, the third section of said series including means for collecting said liquid, and means for controlling the delivery of liquid to said first section.

9. A degasifier comprising a chamber having a liquid inlet port, a gas discharge port, and a liquid delivery port, means associated with said inlet port for breaking the liquid entering said chamber into a mass of separate drops, means within said chamber for collecting and consolidating such liquid into a consolidated body of slowly moving liquid and for causing such liquid to move upwardly throughout at least a portion of its travel in such consolidated form, and means communicating with said delivery port for withdrawing liquid from said chamber.

10. A degasifier for liquids comprising a chamber having a liquid inlet port, a gas discharge port, and a liquid delivery port, means associated with the liquid inlet port for delivering said liquid into said chamber in the form of a mass of separate drops, and means within said chamber for alternately consolidating such liquid into a body of slowly moving liquid which moves upwardly throughout the final portion of its travel in such consolidated form, and causing a relatively rapid downward movement thereof while its surface area is extended and means associated with said delivery port for withdrawing liquid from said degasifier.

In witness whereof, I have hereunto set my name.

RALPH W. CADMAN.